United States Patent
Gao et al.

(10) Patent No.: US 9,472,098 B2
(45) Date of Patent: Oct. 18, 2016

(54) VEHICLE-BASED ABNORMAL TRAVEL EVENT DETECTING AND REPORTING

(71) Applicant: International Business Machines Corporation, Armonk, NY (US)

(72) Inventors: Longxiang Gao, Box Hill South (AU); Xi Liang, Altona Meadows (AU); Xing Zhi Sun, Beijing (CN); Jianbin Tang, Doncaster East (AU); Yini Wang, Doncaster East (AU); Ziyuan Wang, Malvern East (AU)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/597,961

(22) Filed: Jan. 15, 2015

(65) Prior Publication Data

US 2016/0210857 A1    Jul. 21, 2016

(51) Int. Cl.
*G06F 19/00* (2011.01)
*G06G 7/70* (2006.01)
*G06G 7/76* (2006.01)
*G08G 1/00* (2006.01)
*G08G 1/09* (2006.01)
*G08G 1/01* (2006.01)

(52) U.S. Cl.
CPC .............. *G08G 1/09* (2013.01); *G08G 1/0129* (2013.01); *G08G 1/0137* (2013.01)

(58) Field of Classification Search
CPC .... G08G 1/09; G08G 1/0129; G08G 1/0137; G08G 1/0104; G08G 1/096716; G08G 1/096775; G08G 1/096741; G08G 1/20
USPC ...................................... 701/1, 117
See application file for complete search history.

(56) References Cited

U.S. PATENT DOCUMENTS 7,421,334 B2 * 9/2008 Dahlgren ............... G01C 21/26
                                                      340/989
7,840,342 B1    11/2010 Breed
(Continued)

FOREIGN PATENT DOCUMENTS

CN           203179114 U      9/2013

OTHER PUBLICATIONS

Lefaix et al., "Motion-based Obstacle Detection and Tracking for Car Driving Assistance," Pattern Recognition, 2002. Proceedings. 16th International Conference on , vol. 4, no., pp. 74,77 vol. 4, 2002.
(Continued)

*Primary Examiner* — Jaime Figueroa
(74) *Attorney, Agent, or Firm* — Louis J. Percello; Nicholas D. Bowman (57) ABSTRACT

A travel reporter system is used to report abnormal travel events. In use, a sensor mounted on a vehicle obtains real-time data about an object near the vehicle. The object has an object type which is identified by processing the real-time data with an object recognition subsystem of the travel reporter system. An event evaluation subsystem of the travel reporter system processes the real-time data and the object type in order to determine that the object is associated with an abnormal travel event. The abnormal travel event has an event type which is processed by an event notification subsystem of the travel reporter system in order to select a first information consumer type. The event notification subsystem reports the abnormal travel event to information consumers having the first information consumer type.

9 Claims, 5 Drawing Sheets

(56) References Cited

U.S. PATENT DOCUMENTS

| | | | |
|---|---|---|---|
| 8,463,487 B2 | 6/2013 | Nielsen et al. | |
| 8,560,164 B2* | 10/2013 | Nielsen | G06Q 10/0631 340/576 |
| 8,903,593 B1* | 12/2014 | Addepalli | H04W 4/046 701/29.1 |
| 9,109,913 B2* | 8/2015 | Lu | G01C 21/3461 |
| 2004/0145496 A1 | 7/2004 | Ellis | |
| 2005/0065711 A1* | 3/2005 | Dahlgren | G01C 21/26 701/117 |
| 2007/0282519 A1* | 12/2007 | Emam | G08G 1/017 701/117 |
| 2008/0111666 A1* | 5/2008 | Plante | G07C 5/008 340/425.5 |
| 2009/0005962 A1* | 1/2009 | Shinto | G01C 21/3415 701/532 |
| 2009/0105932 A1* | 4/2009 | Choi | G08G 1/096716 701/117 |
| 2010/0076621 A1* | 3/2010 | Kubotani | G08G 1/166 701/1 |
| 2011/0060496 A1* | 3/2011 | Nielsen | G06Q 10/0631 701/31.4 |
| 2011/0093304 A1* | 4/2011 | Nielsen | G06Q 10/0631 705/7.12 |
| 2011/0251735 A1* | 10/2011 | Hayashi | B61L 27/0094 701/2 |
| 2014/0149030 A1 | 5/2014 | Chapman et al. | |
| 2014/0297758 A1* | 10/2014 | Kidron | H04L 51/20 709/206 |
| 2015/0088382 A1* | 3/2015 | Obuchi | B60K 31/00 701/41 |

OTHER PUBLICATIONS

Lensky et al., "Vehicle License Plate Detection using Local Fractal Dimension and Morphological Analysis," Strategic Technology, The 1st International Forum on, pp. 47,50, Oct. 18-20, 2006, doi: 10.1109/IFOST.2006.312243.

VISIONDRIVE In-Vehicle Drive Recorders and Car Cameras, http://web.archive.org/web/20130315121857/http://www.visiondrive.net.au/, (accessed on Mar. 15, 2013; saved on Jan. 15, 2015).

Zhu et al., Feature Point Tracking for Car Speed Measurement., in 'APCCAS', © 2006 IEEE, pp. 1144-1147.

Brady-Myerov, M. "Hit a Pothole? Tell Boston with New Smartphone App," http://www.wbur.org/2012/04/24/boston-smart-bumb-app (last modified Apr. 24, 2012; last accessed Jan. 8, 2015 9:22 AM).

Mell, P. et al., "The NIST Definition of Cloud Computing," Recommendations of the National Institute of Standards and Technology, U.S. Department of Commerce, Special Publication 800-145, 7 pgs., Sep. 2011.

Gao et al., "Vehicle-Based Abnormal Travel Event Detecting and Reporting", U.S. Appl. No. 15/177,379, filed Jun. 9, 2016.

IBM, "List of IBM Patents or Patent Applications Treated as Related", Jun. 7, 2016, 2 pages.

* cited by examiner

VEHICLE-BASED ABNORMAL TRAVEL EVENT DETECTING AND REPORTING

BACKGROUND

The present disclosure relates to data processing, and more specifically, to detecting and reporting abnormal travel events with a travel reporter system.

Stationary pole-mounted video cameras are commonly used to monitor roadways in certain cities. When an accident or other adverse event occurs, it may be possible to obtain video footage of the event in order to analyze the causes of the event. Furthermore, these video cameras may be useful for monitoring traffic conditions and, when necessary, determining where traffic should be rerouted. On the other hand, in some situations, there may not be enough cameras or other sensors to provide adequate roadway monitoring and updates.

SUMMARY

According to embodiments of the present disclosure, aspects of the disclosure may include a vehicle-implemented method for using a travel reporter system to report abnormal travel events. In some embodiments, an electronic data sensor mounted on a vehicle obtains real-time data about an object located within a predetermined distance of the vehicle. The object has an object type which is identified by processing the real-time data with an object recognition subsystem of the travel reporter system. An event evaluation subsystem of the travel reporter system processes the real-time data and the object type in order to determine that the object is associated with an abnormal travel event. The abnormal travel event has an event type which is processed by an event notification subsystem of the travel reporter system in order to select a first information consumer type. The event notification subsystem reports the abnormal travel event to information consumers having the first information consumer type.

According to embodiments of the present disclosure, aspects of the disclosure may also include a travel reporter system for reporting abnormal travel events. In some embodiments, the travel reporter system includes an electronic data sensor mounted on a vehicle and configured to obtain real-time data about an object located within a predetermined distance of the vehicle. The travel reporter system also includes at least one computer that has a memory and a processor in communication with the memory. Also included in the computer is an object recognition subsystem, an event evaluation subsystem, and an event notification subsystem. The object recognition subsystem is configured to identify an object type of the object by processing the real-time data. The event evaluation subsystem is configured to process the real-time data and the object type in order to determine that the object is associated with an abnormal travel event. The event notification subsystem is configured to process an event type of the abnormal travel event in order to select a first information consumer type. The event notification subsystem is also configured to report the abnormal travel event to information consumers having the first information consumer type.

According to embodiments of the present disclosure, aspects of the disclosure may also include a computer program product for reporting abnormal travel events. The computer program produce includes a computer readable storage medium having program instructions embodied therewith. These program instructions are executable by a computer to cause the computer to perform a method. As part of the method, real-time data about an object located within a predetermined distance of a vehicle is obtained from an electronic data sensor mounted on a vehicle. An object type of the object is identified by processing the real-time data. By processing the real-time data and the object type, a determination is made that the object is associated with an abnormal travel event. A first information consumer type is selected by processing an event type of the abnormal travel event. The abnormal travel event is reported to information consumers having the first information consumer type.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data processing, and more specifically, to detecting and reporting abnormal travel events with a travel reporter system. While the present disclosure is not necessarily limited to such applications, various aspects of the disclosure may be appreciated through a discussion of various examples using this context.

In some situations, certain sensors, such as vehicle-mounted cameras, may be useful in recording travel events as they occur. However, these sensors may not be connected to systems that are configured to provide automatic, real-time analysis of the real-time data that is captured by the sensors. Furthermore, even in situations where a sensor is associated with a relatively simple event analysis system, the system may not be configured to analyze, detect, and report a wide range of travel event types.

In some embodiments, vehicle-based travel event detecting and reporting systems (e.g., travel reporter systems) may be utilized to detect and analyze many different types of travel events using one or more sensors or other information sources to collect data that is important in event detection. Furthermore, in some embodiments, these systems may be configured to select which types of information consumers are to be notified about a given travel event and notify those information consumers accordingly. As described herein, technologies utilized in these systems may include, for example, speed detection, license plate detection, obstacle isolation, radar, infrared ice or water detection, temperature detection, and vibration detection. In some embodiments, portions or all of the devices that implement these technologies may be physically located on the vehicle that detects the real-time data that these devices rely upon. Sources of real-time data may be numerous and types of data may include, for example, geographic location data, road sign data, and other data.

In some embodiments, travel reporter systems may be further configured to make determinations as to how, when, and to whom specific travel events should be reported. Without such determinations, the default may be to report every travel event to every entity every time. This may create certain problems relating to information overload and habituation. In some embodiments, these problems may be mitigated by limiting the travel events that are reported to only abnormal travel events and, further, by limiting the reporting of any given abnormal travel event to only those types of individual information consumers that are likely to have an interest in or a need know about that particular abnormal travel event. Abnormal travel events that may be of interest may include, for example, traffic violations, weather updates, and road condition updates. Furthermore, abnormal travel events may, in some embodiments, be divided up into driving-behavior related travel events (e.g., parking offenses, turning without signaling, failing to yield right of way) and road-condition related travel events (e.g., icy or snowy road surfaces, obstacles in the roadway, potholes).

In some embodiments, a travel reporter system may be able to provide information consumers with a complete and timely view of information by managing multiple information sources. When in use, information, including images and video footage, may be captured by electronic vehicle sensors and stored in travelling data recorders located on a vehicle. This data may then be processed by an object recognition subsystem of the travel reporter system and used to detect objects moving nearby (relative to the vehicle) in real-time. After the objects are identified, an event processing component of the travel reporter system may collect information about state changes of the objects, analyze object and event features, and detect abnormal occurrences by interacting with a rule engine or event criteria database. After events are identified, an event notification subsystem of the travel reporter system may be used to classify unusual events in terms of different goals of different types of information consumers and report the results of the analysis to various information consumers. This classifying of events may mean that a particular information consumer may only be provided with reports that would be of interest to him. For example, a driver of a vehicle a mile ahead of a travel reporter system on a roadway may not be interested in a pothole that the travel reporter system detected, but a second driver of a second vehicle a mile behind the travel reporter system on the roadway may be interested to learn about the pothole.

In some embodiments, an application programming interface (API) may be used to alert information consumers. For example, an API may be used to alert drivers in surrounding cars about abnormal travel events and notify government agencies about other abnormal travel events. Further, in some embodiments, an API may be used to expose services for all interactions between the travel reporter system and third parties. This may require this API to handle such task as data transport and authentication.

In some embodiments, a travel reporter system may support the acquisition of real-time data from a comprehensive variety of sources. This data may then be analyzed and tailored event information may be reported via real-time (or near real-time) transmissions to interested and authorized information consumers. Furthermore, with multiple vehicles having multiple travel reporters working in a synchronized manner, a network of dynamic mobile sensors may be created which can deliver information about abnormal travel events in a way that is more timely and more accurate than using static sensors (e.g., traditional, post-mounted road cameras) alone. The result of such a network may be the ability to explore and expose a variety of information services about a variety of events to selected information consumers (e.g., medical or police personnel).

Figure 1:
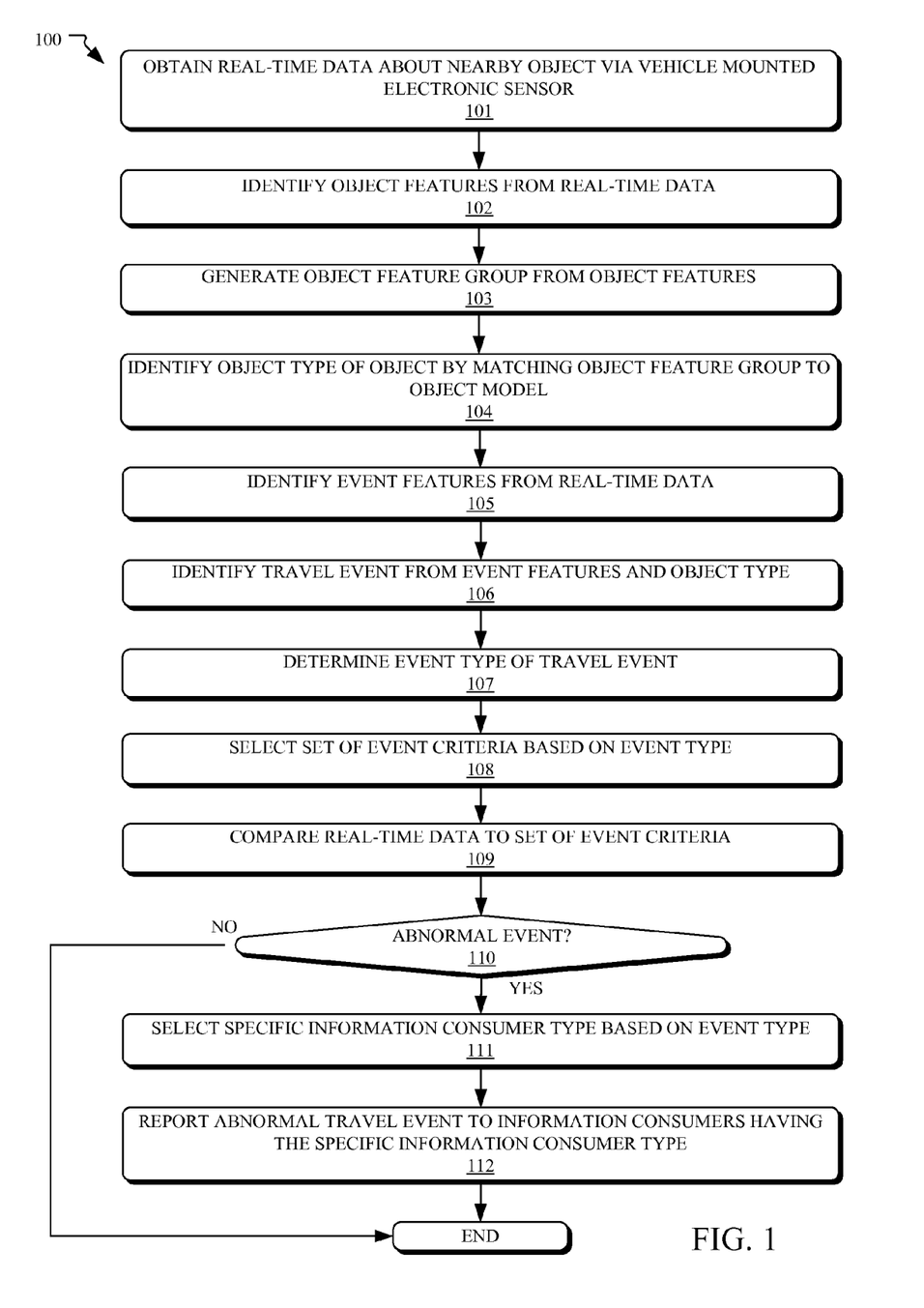
FIG. 1 illustrates a flowchart diagram of an example method for detecting and reporting abnormal travel events, in accordance with embodiments of the present disclosure.

Referring now to FIG. 1, shown is a flowchart diagram of an example method 100 for detecting and reporting abnormal travel events, in accordance with embodiments of the present disclosure. In some embodiments, one or more operations of method 100 may be performed by a vehicle having one or more onboard sensors and a computer, such as computer 12 shown in FIG. 3. Method 100 may begin at operation 101, wherein at least one sensor mounted on the vehicle (e.g., a video camera, radar, a vibration sensor, and an audio recorder) is used to obtain (e.g., detect) real-time data about an object located near the vehicle. In some embodiments, the computer may be used to make a threshold determination as to whether an object is near a vehicle. Furthermore, in some embodiments, the determination as to whether the object is considered to be nearby the vehicle may be made based on the context. For example, in some embodiments, an object may be considered to be nearby the vehicle only if it is within a predetermined distance of the vehicle. This predetermined distance may vary based on certain factors, such as the speed of the vehicle and the type of object. For example, a pothole that is one hundred yards from a vehicle may be considered near the vehicle if the vehicle is traveling at a speed of seventy miles per hour, but may not be considered near the vehicle if the vehicle is traveling at a speed of twenty-five miles per hour. Furthermore, in some embodiments, an object may be considered near a vehicle only if it is within the range of the one or more sensors. Furthermore, in some embodiments, an object within a vehicle (e.g., a person) may be considered to be near the vehicle.

In some embodiments, operations 102-104 may be used by the computer to identify the object type of the object about which the real-time data is collected. Specifically, per operation 102, the computer identifies object features from the real-time data. These object features may include attributes which are significant for object recognition purposes, such as distinguishing between objects having similar object types. Examples of object features may include shape, size, and color. Per operation 103, the computer generates an object feature group from these object features. This object feature group may include a specific group of object features selected from among all of the object features identified in operation 102. The object feature group may be selected based on a determination that these particular object features likely relate to a specific object to which the other object features do not relate. This may involve, for example, separating the object features that are associated with background images or sounds from those object features that are more directly useful in recognizing the object of interest. Per operation 104, the computer identifies the object type by matching the object feature group to an object model. The object model may be selected from a database used to store multiple object models of different types. Multiple object models may need to be analyzed before a match is found and the object type of the target object is identified.

In some embodiments, operations 105-107 may be used to identify a travel event associated with an object identified in operations 102-104. Per operation 105, event features may be identified from the real-time data collected by the at least one sensor. As used herein, event features may refer to aspects or attributes of events (e.g., occurrences) that may be useful in detecting specific events, event types, and event severity. Event features in the same time frame may be logged, categorized, and aggregated in order to create broad compilations of event features that may be useful in detecting when an event occurs and the causes and results of the event. Examples of event features may include certain changes in object behaviors, such as swerving or acceleration of vehicles. Per operation 106, the computer may identify a specific travel event by processing the event features and the object type (e.g., the object type identified in operation 104). In some embodiments, the object type may weigh more or less heavily in identifying the travel event, in particular, for events that are often or always associated with a particular object. For example, an event of swerving to avoid a pothole may always be associated with a pothole object type. Per operation 107, the computer determines the event type of the travel event. For example, for the event of swerving to avoid a pothole, the event type may be hazard or hazard avoidance.

In some embodiments, operations 108-112 may be used to determine whether an identified travel event is abnormal and, if the event is abnormal, notifying the appropriate entities. Per operation 108, the computer selects a set of (i.e., one or more) event criteria based on the event type of the travel event (as determined in operation 107). The set of event criteria may be selected from among any number of possible event criteria. The set of event criteria may be useful in evaluating whether an identified travel event is an abnormal travel event (which is worth reporting) or a normal event (which may be wasteful or unhelpful to report). In some embodiments, the set of event criteria may include a set of rules and/or a set of thresholds. For example, in a threshold-based embodiment, a travel event may only be considered abnormal if some aspect of the event achieves a specific threshold. For example, for a travel event of a speeding vehicle, it may only be deemed an abnormal travel event if the speed of the speeding vehicle is at least five miles per hour over the speed limit. Furthermore, in some embodiments, historical norms, such as averages and deviations, may be utilized in determining whether a travel event is abnormal.

Per operation 109, the real-time data collected by the at least one vehicle sensor may be compared to the set of event criteria. Per operation 110, a determination is made, based on the comparison, as to whether the travel event is an abnormal travel event. If the travel event is not deemed an abnormal travel event the method 100 may be completed without the travel event being reported. If, however, per operation 110, the travel event is determined to be an abnormal travel event, then, per operation 111, a specific information consumer type may be selected based on the event type of the travel event. This operation may aid in ensuring that only those individual consumers that are likely to be interested in this particular travel event are provided information about the abnormal travel event. Per operation 112, the abnormal travel event is reported to information consumers that have the information consumer type selected in operation 111. In some embodiments, there may be several different information consumer types. These may include, for example, a surrounding vehicle information consumer type (e.g., a type that includes vehicles within a predetermined distance of the vehicle performing method 100) or a police authorities information consumer type. Furthermore, each information consumer type may be associated with one or more event types. For example, the surrounding vehicle information consumer type may be associated with a nearby hazard event type. Furthermore, in some embodiments, the information consumer type may be selected not only based on the event type of the traveling event, but also based on the severity of the travel event. For example, a small pothole might be reported to road repair authorities, while a large pothole might be reported to both the road repair authorities and surrounding vehicles (e.g., because the situation is more dangerous), even though these information consumers may have different types.

While an example embodiment of method 100 is described herein, many other variants on method 100 are contemplated. For example, in some embodiments, multiple objects having one or more object types may be identified in a single time frame. Once two or more objects are identified, event features relating to both objects may be identified and used to identify one or more abnormal travel events. By combining information about multiple objects into a single analysis, a more complete picture of a travel event may be identified. For example, in a scenario where a vehicle swerves to avoid an overturned construction barrel, it may be helpful to identify the object types of both the vehicle and the barrel in order to evaluate a single travel event (e.g., a hazard-in-the-travel-lane travel event).

In another variant on method 100, in some embodiments, a travel reporter system may be configured for determining which object (or objects) is responsible for a particular travel event. This may be helpful in identifying and adequately reporting a travel event. For example, in a scenario where a travel reporter system detects two cars swerving and a pothole between them, the travel reporter system may determine that the pothole (rather than the two vehicles) is responsible for the travel event and report it accordingly.

In yet another variant on method 100, in some embodiments, one or more operations of method 100 may rely not only on real-time data about an object of interest but also on other types of data. These other types of data may be obtained from remote sources (e.g., third party information sources that are not within the predetermined distance of the vehicle performing the method 100). Furthermore, these types of data may include, for example, historical data and concurrent data, as described elsewhere herein.

In yet another variant on method 100, in some embodiments, a travel reporter system may be further configured to detect and report abnormal travel events that are occurring within the vehicle performing the method 100. For example, method 100 could be used to detect a small child sitting in a passenger seat of the vehicle (e.g., based on a weight sensor in the seat) and the temperature within the vehicle. The travel reporter system may then determine that the temperature within the vehicle is too low (or too high) and report this to the relevant information consumer (e.g., the driver of the vehicle).

Other variants on this in-vehicle scenario are also possible. For example, in some embodiments, detecting a weight below a threshold or within a range in a passenger seat may cause the vehicle (e.g., via the travel reporter system) to automatically maintain the temperature of the vehicle within an acceptable range. Further, in some embodiments, the weight in the passenger seat may not trigger a temperature alert or other temperature control measures unless one or more other indicators are also present. Such an indicator could include, for example, a lack of weight (or weight below a threshold) on a driver's seat (indicating that the driver is not in the vehicle). Such indicator could also include the vehicle being in park or neutral. Further, in some embodiments, the temperature alert in such a situation may take the form of a text message or other message to the absent driver or owner of the vehicle warning him about the presence of the adverse temperature event and the potential presence of a child or other type of person in the vehicle.

Figure 2:
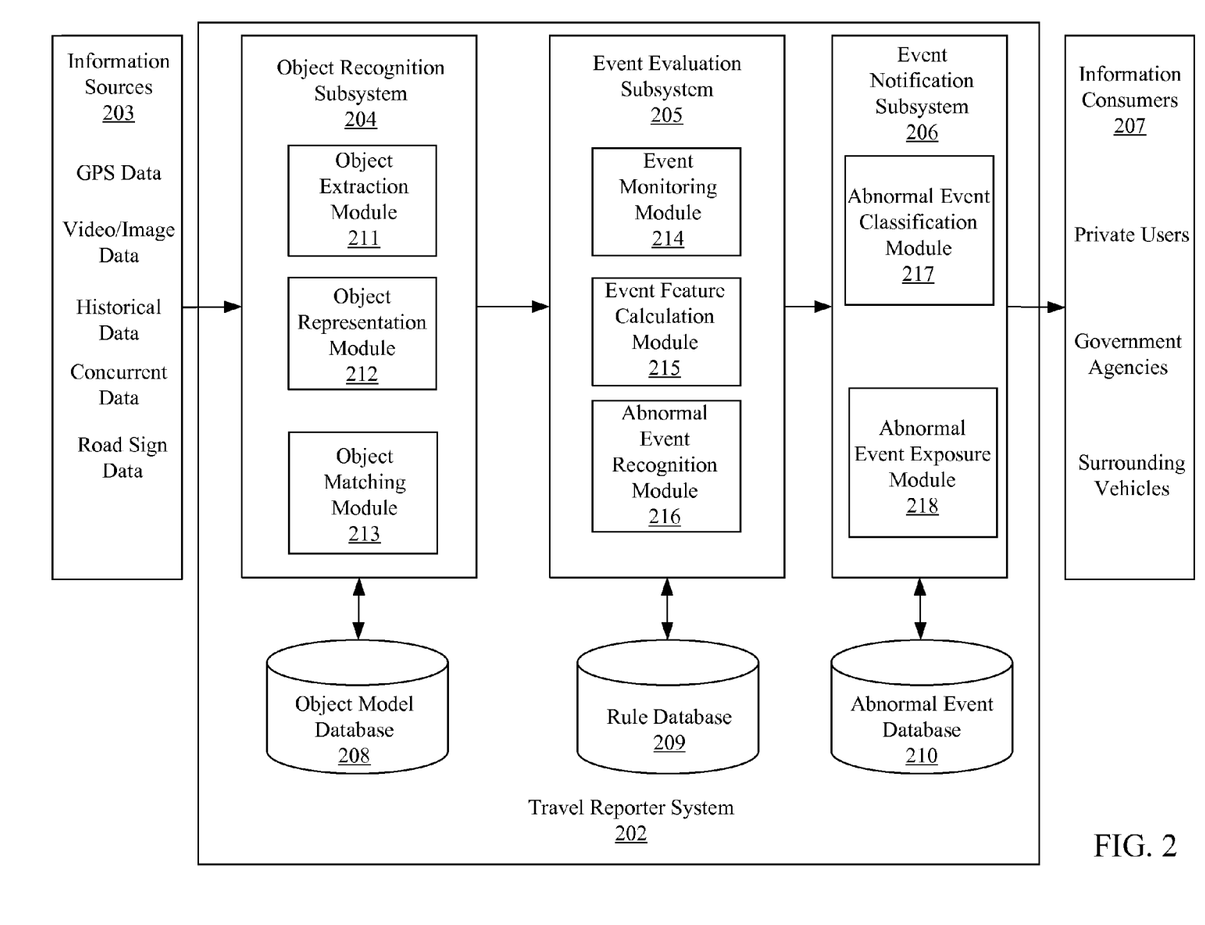
FIG. 2 illustrates a block diagram of an example travel reporter system that may be used in detecting and reporting abnormal travel events, in accordance with embodiments of the present disclosure.

Referring now to FIG. 2, shown is a block diagram of an example travel reporter system 202 that may be used in detecting and reporting abnormal travel events, in accordance with embodiments of the present disclosure. In some embodiments, the travel reporter system 202 may be configured to receive information from one or more information sources 203, analyze the received information, and output the results of the analysis to one or more information consumers 207 (surrounding vehicles, police authorities, etc.). Information sources 203 may include, for example, real-time data collected from vehicle-mounted sensors, such as GPS data (providing vehicle location, vehicle speed, etc.), video/image data (e.g., providing road sign information), and audio data. Other information sources may include historical data or concurrent data, either collected previously by the vehicle-mounted sensors or collected from some third-party information source. More specifically, historical data may include, for example, accident records or government agency reports and concurrent data may include, for example, weather reports or traffic reports from news agencies.

Figure 3:
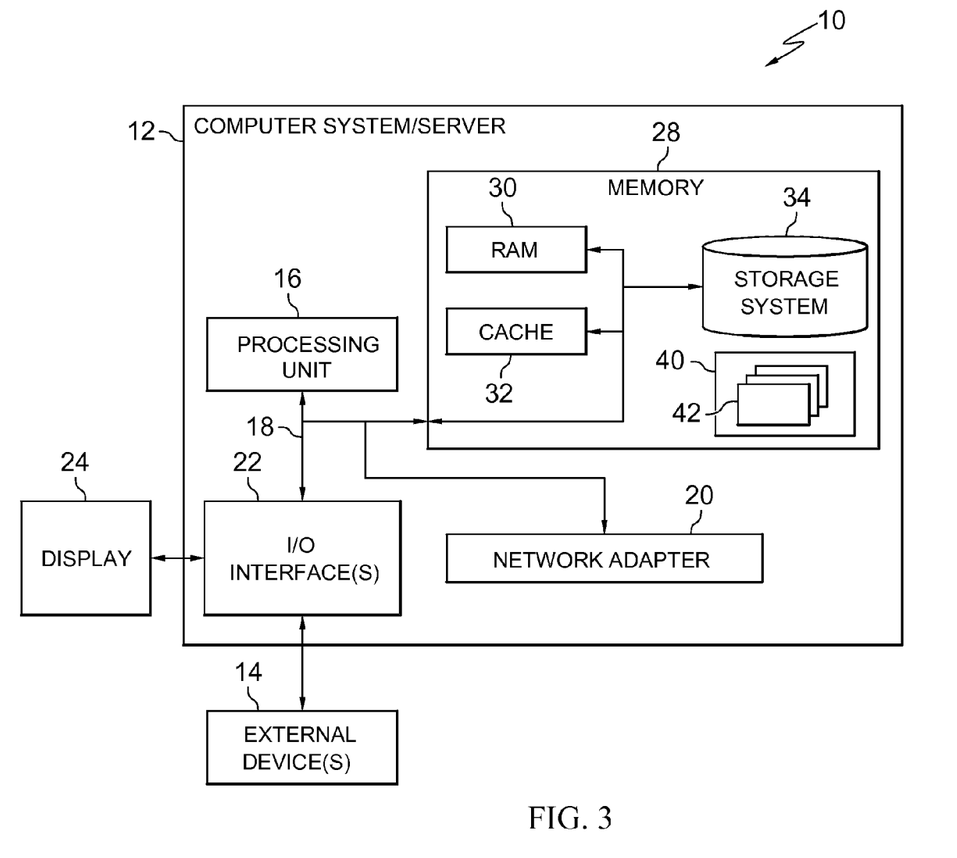
FIG. 3 illustrates a diagram of a cloud computing node, in accordance with embodiments of the present disclosure.

In some embodiments, travel reporter system 202 may be implemented using one or more computers, such as computer 12 of FIG. 3. Furthermore, in some embodiments, travel reporter system 202 may be implemented in a cloud computing environment as described herein. For example, certain databases or processing elements of the travel reporter system 202 may be housed at a location remote from the vehicle that detects the real-time data.

The travel reporter system 202 may include an object recognition subsystem 204, an event evaluation subsystem 205, and an event notification subsystem 206. The object recognition subsystem 204 may be configured to find and identify objects (e.g., by object type) in the real-world environment near (e.g., inside, next to) the vehicle. The object recognition subsystem may include an object extraction module 211, an object representation module 212, and an object matching module 213.

The object extraction module 211 may be configured to identify object features in the real-time data collected from the information sources 203. In some embodiments, this identification may involve locating and recognizing arbitrary collections of image regions through partitioning one or more images or videos into meaningful segments. The object features (as extracted from an image, for example) may be helpful for forming object hypotheses from large amounts of data and for achieving a simplified representation of an image that can be processed further.

The object representation module 212 may group the object features identified by the object extraction module 211 into meaningful collections, such as object feature groups that are associated with a particular object. The object feature groups may be generated based on internal image descriptions (e.g., abstract features vectors) of known objects that are stored in an object model database 208. More specifically, comparing object feature groups to object models (e.g., known object descriptions) stored in object model database 208 may be useful in determining that one or more objects in an image are of particular object types. The object matching module 213 may employ matching techniques to select the most likely object type as the correct object type for each identified object feature group.

In some embodiments, the event evaluation subsystem 205 may be configured to determine whether one or more objects identified by the object recognition subsystem 204 are associated with an abnormal travel event. This may involve detecting meaningful and abnormal events by tracking and analyzing state changes (e.g., movements) of identified objects and deriving conclusions based on these state changes. The event evaluation subsystem 205 may include an event monitoring module 214, an event feature calculation module 215, and an abnormal event recognition module 216.

The event monitoring module 214 may be configured to identify a plurality of event features associated with the one or more objects identified by the object recognition subsystem 204. This may involve further processing of the data collected from the information sources 203. More specifically, changes of the behaviors (e.g., motion patterns) of objects may be identified in the real-time data and certain event features may be logged or recorded for further analysis.

The event feature calculation module 215 may be configured to determine that the object is associated with a travel event having a particular event type by processing both the event features as identified by the event monitoring module 214 and the object type as identified by the object recognition subsystem 204. This may involve categorizing and aggregating the event features into composite event occurrences (e.g., travel events) through analyzing the event features that are logged by the event monitoring module 214. The event type of the event may also be identified at the same time.

The abnormal event recognition module 216 may be configured to determine whether a travel event identified by the event feature calculation module 215 is an abnormal travel event. This may involve first determining a proper set of criteria for evaluating the travel event. The set of criteria may be selected, based on the event type of the travel event, from a pool of potential rules (e.g., criteria) stored in a rule database 209. The real-time data and event features may then be compared to the set of criteria. Based on the comparison, the abnormal event recognition module 216 may determine whether the travel event is an abnormal travel event. A travel event may be deemed abnormal if it deviates significantly from normal occurrences of that type of event. Information about abnormal travel events may then be stored and information about travel events which are not abnormal may be filtered out and discarded.

In some embodiments, the event notification subsystem 206 may be configured to select an information consumer type, based on the event type of the abnormal travel event identified by the event evaluation subsystem 205. The event notification subsystem 206 may be further configured to report the abnormal travel event to information consumers 207 having that selected information consumer type. The event notification subsystem 206 may include an abnormal event classification module 217 and an abnormal event exposure module 218.

The abnormal event classification module 217 may be configured to classify abnormal travel events by information consumer types (based on their event types) and store information about the categorized abnormal travel events in an abnormal event database 210. The abnormal event classification module 217 may also deliver reports about abnormal events to designated recipients (such as the portion of information consumers 207 having a given information consumer type). These reports may be delivered in any applicable form, including, for example, email or text (SMS) message.

The abnormal event exposure module 218 may be configured to expose the abnormal events stored in the abnormal event database 210 as services to the appropriate information consumers 207. The abnormal event exposure module 218 may be responsible for a variety of reporting related tasks such as authentication and data transport. In some embodiments, the abnormal event exposure module 218 may include or may be coupled to an API.

To aid understanding, an example scenario of the travel reporter system 202 being utilized is provided herein. In this scenario, a first vehicle (target vehicle) traveling at an unsafe speed passes a second vehicle (reporting vehicle) on a highway. The reporting vehicle includes a travel reporter system 202. As the target vehicle moves within a detecting area (e.g., predetermined distance or sensor range) of the reporting vehicle, a camera mounted on the reporting vehicle obtains footage (or one or more images) of the target vehicle. The object recognition subsystem 204 analyzes the footage and identifies the target vehicle as having a vehicle object type. The event evaluation subsystem 205 further processes the footage and determines that the target vehicle is responsible for a speeding event that is occurring. More specifically, using the speed of the reporting vehicle as a base measurement, the speed of the target vehicle is calculated. Road sign data is obtained and used to determine the current speed limit. By comparing the speed limit to the speed of the target vehicle, the event evaluation subsystem 205 determines that the target vehicle is exceeding the speed limit and a travel event of speeding and an event type of traffic violation are identified. The event evaluation subsystem then determines that speed of the target vehicle is above a predetermined amount greater than the speed limit and, therefore, the speeding travel event is an abnormal travel event. Based on the event type of traffic violation, the event notification subsystem 206, classifies the speeding event as being associated with the government authority information consumer type. The event notification subsystem 206 then reports the speeding abnormal travel event to information consumers having the government agency information consumer type (e.g., the report is sent to police officers).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
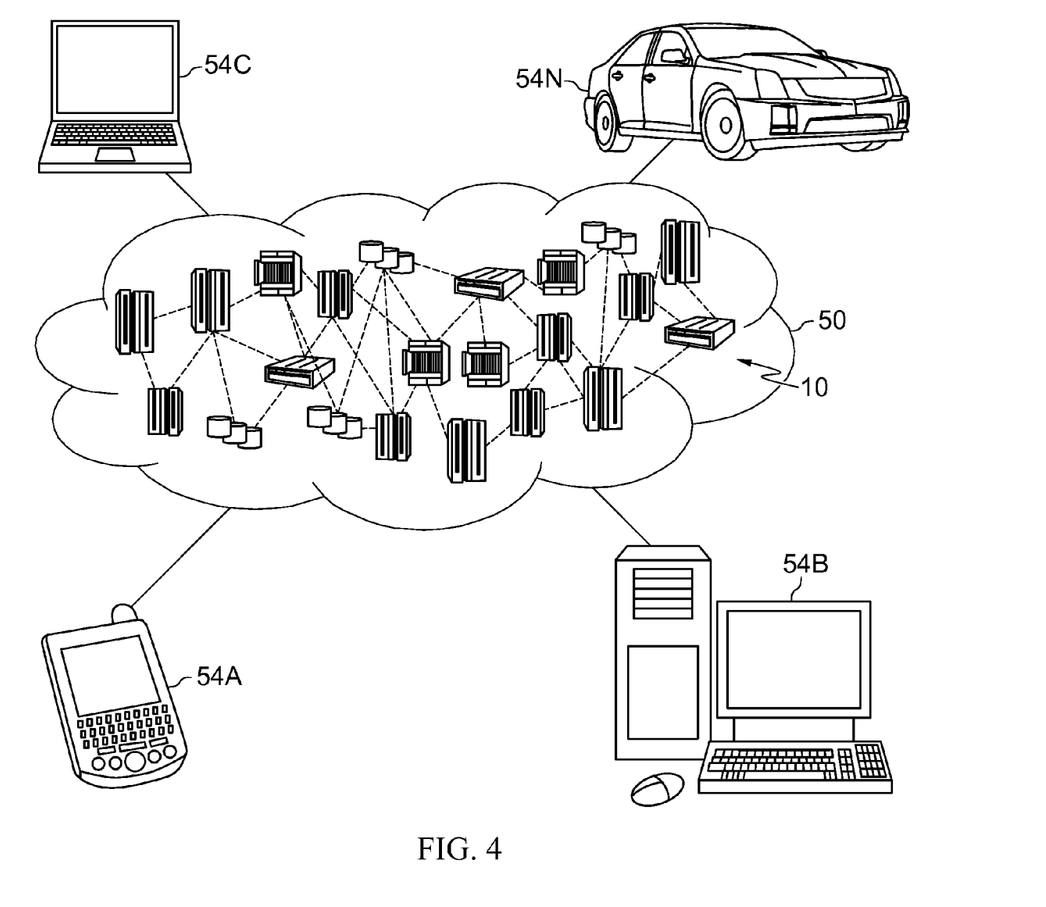
FIG. 4 illustrates a diagram of a cloud computing environment, in accordance with embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
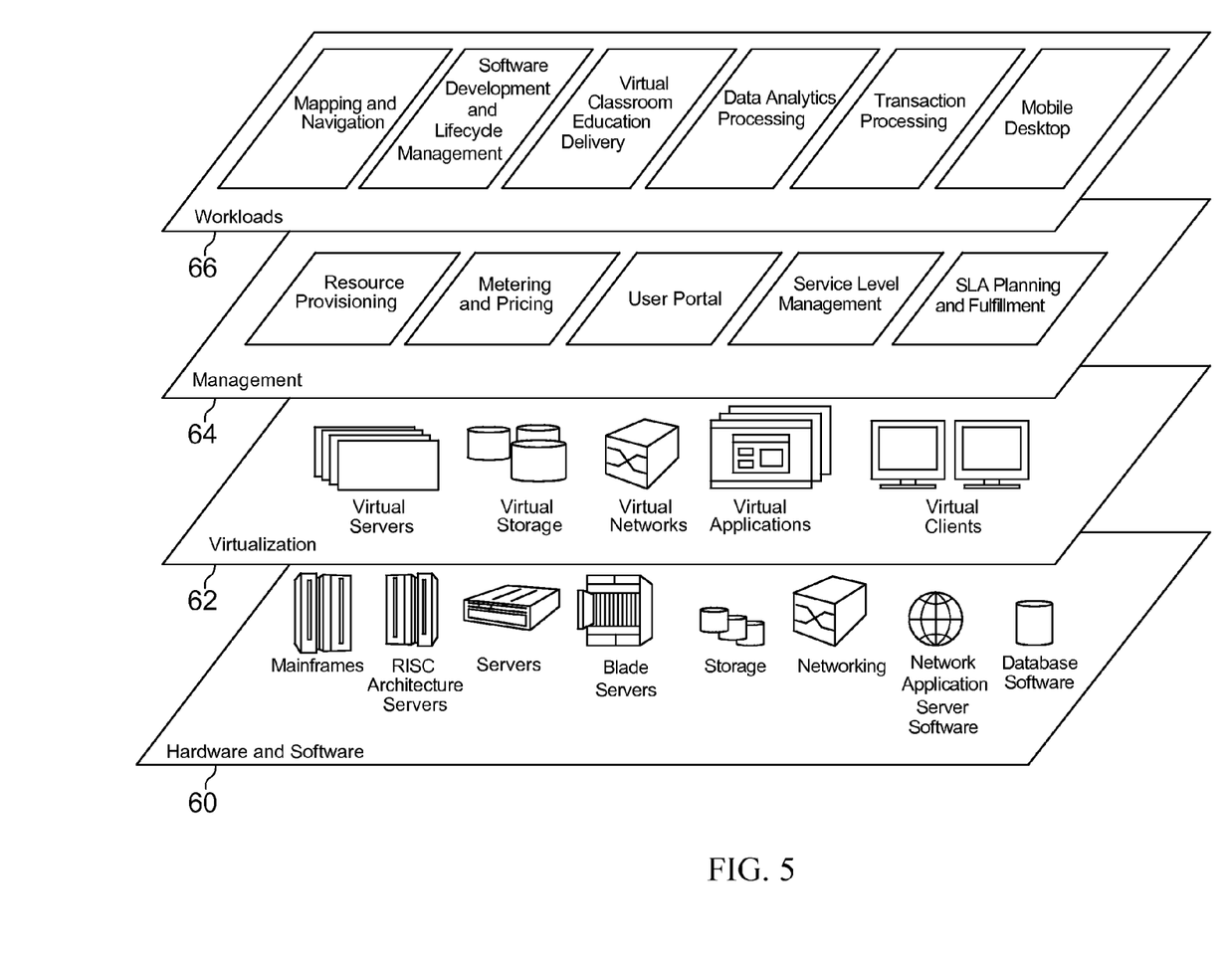
FIG. 5 illustrates a diagram of abstraction model layers, in accordance with embodiments of the present disclosure.

Referring now to FIG. 5, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

In some embodiments, one or more layers, including workloads layer 66, may provide for the detecting and reporting of abnormal travel events as described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle-implemented method for using a travel reporter system to report abnormal travel events, the method comprising:
   obtaining, using at least one electronic data sensor mounted on a vehicle, real-time data about an object located within a predetermined distance of the vehicle, the object having an object type, wherein the at least one electronic data sensor includes a camera, and wherein the obtaining the real-time data about the object includes capturing at least one image of the object with the camera;
   identifying the object type by processing at least the real-time data with an object recognition subsystem of the travel reporter system, wherein the identifying the object type by processing the at least the real-time data with the object recognition subsystem comprises:
      identifying a plurality of object features of the object by processing the at least one image with an object extraction module of the object recognition subsystem;
      generating an object feature group by combining the plurality of object features of the object using an object representation module of the object recognition subsystem; and
      identifying the object type by matching the object feature group to an object model associated with the object type using an object matching module of the object recognition subsystem;
   determining, by processing the at least the real-time data and the object type with an event evaluation subsystem of the travel reporter system, that the object is associated with an abnormal travel event, the abnormal travel event having an event type;
   selecting, by processing the event type with an event notification subsystem of the travel reporter system, a first information consumer type of a plurality of information consumer types; and
   reporting, with the event notification subsystem of the travel reporter system, the abnormal travel event to information consumers having the first information consumer type.

2. The method of claim 1, wherein the event notification subsystem does not report the abnormal travel event to information consumers having a second consumer information type of the plurality of information consumer types and not having the first information consumer type.

3. The method of claim 1, wherein the at least the real-time data includes the real-time data, historical data, and concurrent data.

4. The method of claim 3 further comprising:
   obtaining the historical data and the concurrent data from at least one third party information source located outside of the predetermined distance from the vehicle.

5. The method of claim 1, wherein the determining, by processing the at least the real-time data and the object type with the event evaluation subsystem, that the object is associated with the abnormal travel event comprises:
   identifying a plurality of event features associated with the object by processing the at least the real-time data with an event monitoring module of the event evaluation subsystem;
   determining that the object is associated with a travel event having an event type by processing the plurality of event features and the object type with event feature calculation module of the event evaluation subsystem; and determining that the travel event is abnormal by comparing the at least the real-time data to a set of event criteria associated with the event type using an abnormal event recognition module of the event evaluation subsystem.

6. The method of claim 1, wherein the travel reporter system is configured to report both driving-behavior related travel events and road-condition related travel events.

7. The method of claim 1 further comprising:
determining, by the event evaluation subsystem of the travel reporter system, that the object is responsible for the abnormal travel event.

8. The method of claim 1, wherein the object is a child positioned on a passenger seat of the vehicle, wherein the abnormal travel event is a temperature within the vehicle being outside of a predetermined temperature range, and wherein the information consumers include an absent driver of the vehicle not located within the vehicle.

9. The method of claim 1 further comprising:
storing the real time data about the object in a travelling data recorder located on the vehicle.

* * * * *